(12) United States Patent
Yoda et al.

(10) Patent No.: US 8,556,016 B2
(45) Date of Patent: Oct. 15, 2013

(54) VEHICLE HAVING INTERNAL COMBUSTION ENGINE AND ROTATING ELECTRIC MACHINE AS POWER SUPPLIES

(75) Inventors: Takehito Yoda, Toyota (JP); Atsushi Fujita, Kasai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 814 days.

(21) Appl. No.: 12/451,779

(22) PCT Filed: Jul. 23, 2008

(86) PCT No.: PCT/JP2008/063623
§ 371 (c)(1),
(2), (4) Date: Nov. 30, 2009

(87) PCT Pub. No.: WO2009/014254
PCT Pub. Date: Jan. 29, 2009

(65) Prior Publication Data
US 2010/0101881 A1    Apr. 29, 2010

(30) Foreign Application Priority Data
Jul. 24, 2007    (JP) ................................. 2007-192049

(51) Int. Cl.
*B60R 16/04*    (2006.01)

(52) U.S. Cl.
USPC ..................................... 180/68.5; 180/65.31

(58) Field of Classification Search
USPC .................. 180/68.5, 69.4, 69.5, 65.1, 65.31
See application file for complete search history.

(56) References Cited

U.S. PATENT DOCUMENTS

| | | | | |
|---|---|---|---|---|
| 5,193,635 A | * | 3/1993 | Mizuno et al. | 180/65.25 |
| 5,490,572 A | * | 2/1996 | Tajiri et al. | 180/65.1 |
| 5,518,272 A | * | 5/1996 | Fukagawa et al. | 280/834 |
| 5,641,031 A | * | 6/1997 | Riemer et al. | 429/423 |
| 5,702,125 A | * | 12/1997 | Nakajima et al. | 280/834 |
| 5,794,979 A | * | 8/1998 | Kasuga et al. | 280/834 |
| 6,315,069 B1 | * | 11/2001 | Suba et al. | 180/68.5 |
| 6,378,637 B1 | * | 4/2002 | Ono et al. | 180/65.31 |

(Continued)

FOREIGN PATENT DOCUMENTS

| | | |
|---|---|---|
| EP | 1 710 153 A1 | 10/2006 |
| JP | U-04-049518 | 4/1992 |

(Continued)

OTHER PUBLICATIONS

European Search Report mailed Sep. 26, 2011 issued in European Patent Application No. 08791855.3.

(Continued)

*Primary Examiner* — Jeffrey J Restifo
(74) *Attorney, Agent, or Firm* — Oliff & Berridge, PLC

(57) ABSTRACT

A hybrid vehicle includes a rear floor panel, a cross beam, a rear seat, a battery pack and a fuel tank. The rear floor panel is formed with a raised portion located behind the rear seat. The cross beam is disposed in a region located below the raised portion. The battery pack is disposed between the rear seat and the rear floor panel. The fuel tank is disposed in the region located below the raised portion, and is composed of a body located behind the cross beam and a projecting portion projecting forward from upper side surfaces of the body to extend into the space located between a second rear cross member and the cross beam.

16 Claims, 6 Drawing Sheets

(56) References Cited

U.S. PATENT DOCUMENTS

| | | | |
|---|---|---|---|
| 6,648,085 B2* | 11/2003 | Nagura et al. | 180/65.1 |
| 6,662,891 B2* | 12/2003 | Misu et al. | 180/68.1 |
| 6,893,047 B2* | 5/2005 | Chou et al. | 280/834 |
| 6,978,855 B2* | 12/2005 | Kubota et al. | 429/442 |
| 7,004,274 B2* | 2/2006 | Shibasawa et al. | 180/68.5 |
| 7,051,825 B2* | 5/2006 | Masui et al. | 180/68.5 |
| 7,079,379 B2* | 7/2006 | Yamaguchi et al. | 361/676 |
| 7,086,492 B2* | 8/2006 | Kawasaki et al. | 180/274 |
| 7,533,748 B2* | 5/2009 | Miyajima et al. | 180/68.5 |
| 7,540,343 B2* | 6/2009 | Nakashima et al. | 180/65.1 |
| 7,556,110 B2* | 7/2009 | Yamamoto et al. | 180/65.31 |
| 7,556,113 B2* | 7/2009 | Amori et al. | 180/68.5 |
| 7,559,389 B2* | 7/2009 | Yamashita | 180/65.31 |
| 7,614,684 B2* | 11/2009 | Yasuhara et al. | 296/187.09 |
| 7,637,335 B2* | 12/2009 | Hayashi | 180/68.5 |
| 7,654,351 B2* | 2/2010 | Koike et al. | 180/68.5 |
| 7,688,582 B2* | 3/2010 | Fukazu et al. | 361/690 |
| 7,690,686 B2* | 4/2010 | Hashimura et al. | 280/782 |
| 7,717,207 B2* | 5/2010 | Watanabe et al. | 180/68.5 |
| 7,743,863 B2* | 6/2010 | Shindou | 180/68.5 |
| 7,770,679 B2* | 8/2010 | Takaku et al. | 180/68.5 |
| 7,836,999 B2* | 11/2010 | Kato | 180/312 |
| 7,841,624 B2* | 11/2010 | Kobayashi et al. | 280/834 |
| 7,921,951 B2* | 4/2011 | Watanabe et al. | 180/68.5 |
| 7,926,601 B2* | 4/2011 | Ono et al. | 180/68.5 |
| 7,967,093 B2* | 6/2011 | Nagasaka | 180/68.5 |
| 8,037,960 B2* | 10/2011 | Kiya | 180/68.5 |
| 8,051,934 B2* | 11/2011 | Kiya et al. | 180/68.5 |
| 2001/0030069 A1* | 10/2001 | Misu et al. | 180/68.1 |
| 2003/0186115 A1* | 10/2003 | Shibasawa et al. | 429/100 |
| 2004/0016580 A1* | 1/2004 | Kronner et al. | 180/68.5 |
| 2004/0079569 A1* | 4/2004 | Awakawa | 180/68.5 |
| 2004/0200356 A1* | 10/2004 | Kuperus | 96/147 |
| 2004/0226765 A1* | 11/2004 | Mathews et al. | 180/68.5 |
| 2005/0011692 A1* | 1/2005 | Takahashi et al. | 180/68.5 |
| 2006/0273572 A1 | 12/2006 | Yamamura | |
| 2006/0289224 A1* | 12/2006 | Ono et al. | 180/311 |
| 2007/0215399 A1* | 9/2007 | Watanabe et al. | 180/68.5 |
| 2008/0000703 A1* | 1/2008 | Shindou | 180/68.5 |
| 2008/0196957 A1* | 8/2008 | Koike et al. | 180/68.5 |
| 2009/0090575 A1* | 4/2009 | Nagasaka | 180/68.5 |
| 2009/0145676 A1* | 6/2009 | Takasaki et al. | 180/65.1 |
| 2009/0272590 A1* | 11/2009 | Kim et al. | 180/69.5 |
| 2010/0065359 A1* | 3/2010 | Jufuku et al. | 180/68.5 |
| 2010/0101881 A1* | 4/2010 | Yoda et al. | 180/68.5 |
| 2010/0116576 A1* | 5/2010 | Jufuku et al. | 180/68.5 |
| 2012/0090907 A1* | 4/2012 | Storc et al. | 180/68.5 |
| 2012/0175177 A1* | 7/2012 | Lee et al. | 180/68.5 |

FOREIGN PATENT DOCUMENTS

| | | |
|---|---|---|
| JP | A-05-155258 | 6/1993 |
| JP | A-06-211169 | 8/1994 |
| JP | A-07-156826 | 6/1995 |
| JP | A-2000-085382 | 3/2000 |
| JP | A-2000-238541 | 9/2000 |
| JP | A-2001-138753 | 5/2001 |
| JP | A-2001-180304 | 7/2001 |
| JP | A-2005-001405 | 1/2005 |
| JP | A-2005-119347 | 5/2005 |
| JP | A-2006-069340 | 3/2006 |
| JP | A-2007-008443 | 1/2007 |
| JP | A-2007-039020 | 2/2007 |

OTHER PUBLICATIONS

International Search Report issued in International Application No. PCT/JP2008/063623 on Nov. 11, 2008. (with translation).

* cited by examiner

FRONT SIDE OF VEHICLE ←

VEHICLE HAVING INTERNAL COMBUSTION ENGINE AND ROTATING ELECTRIC MACHINE AS POWER SUPPLIES

TECHNICAL FIELD

The present invention relates to a vehicle having an internal combustion engine and a rotating electric machine as power sources, and more particularly relates to a vehicle having mounted thereon a power storage device that stores driving electric power of the rotating electric machine and a fuel tank that holds fuel to be burned in the internal combustion engine.

BACKGROUND ART

A hybrid vehicle is publicly known in which a battery storing electric power to be supplied to a driving motor is disposed in a luggage compartment located behind a rear seat. In the hybrid vehicle, the battery needs to be protected against shock in case of a vehicle crash. However, providing any particular reinforcement for battery protection will disadvantageously increase the weight of the vehicle body, resulting in degraded driving performance. A technique of solving such disadvantage is disclosed in, for example, Japanese Patent Laying-Open No. 2007-8443.

With a vehicular power supply device disclosed in Japanese Patent Laying-Open No. 2007-8443, electric power from a battery is supplied to a motor that drives the vehicle. This vehicle includes a battery box that houses the battery therein, a rear seat, right and left side frames extending in the front-to-rear direction of the vehicle, a cross member connecting the right and left side frames on the bottom face of the front portion of a seat cushion of the rear seat, and a fuel tank disposed in the space enclosed by the right and left side frames, the cross member and the bottom face of the seat cushion. The right and left side frames each have a portion curved upwardly at a position that corresponds to a rear wheel house located behind the rear seat. The right and left ends of the battery box are connected between the apexes of the curved portions. Part of the battery box projects upwardly from the apexes of the curved portions.

With the vehicular power supply device disclosed in Japanese Patent Laying-Open No. 2007-8443, the battery box that houses the battery therein is mounted between the right and left side frames. This not only allows the battery box to be protected by the right and left side frames against shock in case of a side crash, but also ensures the largest capacity of the battery box. Further, connecting the right and left ends of the battery box to the right and left side frames, respectively, not only allows the battery box to be mounted firmly on the vehicle body, but also improves the rigidity of the right and left side frames because of the presence of the battery box.

However, in the vehicular power supply device disclosed in Japanese Patent Laying-Open No. 2007-8443, part of the battery box projects upwardly from the apexes of the curved portions of the right and left side frames. This reduces the space located behind the rear seat in a vehicle compartment (luggage compartment), resulting in degradation of interior comfort.

DISCLOSURE OF THE INVENTION

The present invention was made to solve the above problem. An object of the present invention is to provide a vehicle having an internal combustion engine and a rotating electric machine as power supplies that makes effective use of the space in the neighborhood of a rear seat to ensure the mounting space for a power storage device and a fuel tank without degrading the comfort in a vehicle compartment.

A vehicle according to the present invention has an internal combustion engine and a rotating electric machine as power sources. The vehicle includes a rear seat disposed above a floor panel, a power storage device disposed in a region located below the rear seat for storing driving electric power of the rotating electric machine, a fuel tank disposed in a region located behind the power storage device and below the floor panel for holding liquid fuel to be burned in the internal combustion engine, and a suspension member and a vehicle structural member disposed in a region located behind the rear seat and below the floor panel. The fuel tank includes a portion extending into a space located between the suspension member and the vehicle structural member.

According to the present invention, the liquid fuel to be burned in the internal combustion engine is usually a highly volatile liquid such as gasoline or alcohol. Therefore, the fuel tank holding the liquid fuel to be burned in the internal combustion engine needs to be airtight, but may be formed in a relatively optional shape, which means that the fuel tank is less restricted in shape than the power storage device that houses therein a plurality of battery cells and the like. Accordingly, the power storage device is disposed in the region located below the rear seat where the suspension member and the vehicle structural member are not disposed so that a significantly large space can be ensured. The fuel tank is disposed in the region located behind the power storage device and below the floor panel. Further, taking advantage of the characteristic of being less restricted in shape, the fuel tank has a portion arranged to extend into the space located between the suspension member and the vehicle structural member (e.g., a cross member). This allows utilization of the vacant space located below the rear seat that is usually less likely to be used, as the space for the power storage device, and also allows the narrow space located below the floor panel between the suspension member and the vehicle structural member (i.e., external to the vehicle compartment) to be effectively utilized as the space for the fuel tank which is less restricted in shape than the power storage device. Accordingly, the mounting space for the power storage device and the fuel tank can be ensured without degrading the comfort in the vehicle compartment. As a result, a vehicle having an internal combustion engine and a rotating electric machine as power supplies can be provided that makes effective use of the space in the neighborhood of the rear seat to ensure the mounting space for the power storage device and the fuel tank without degrading the comfort in the vehicle compartment.

Preferably, the suspension member is arranged to extend in a side-to-side direction of the vehicle. The vehicle structural member is a cross member arranged on the bottom face of the floor panel located behind the rear seat to extend in the side-to-side direction of the vehicle.

According to the present invention, the suspension member is disposed to extend in the side-to-side direction of the vehicle. The cross member is disposed on the bottom face of the floor panel located behind the rear seat (i.e., above the fuel tank) to extend in the side-to-side direction of the vehicle. This allows the narrow space located between the suspension member and the cross member to be effectively utilized as the space for the fuel tank, and also allows the fuel tank to be protected by the cross member without having to provide any particular reinforcement when loads are applied sideways to the vehicle in case of a vehicle crash.

More preferably, the vehicle further includes right and left side members connected to opposite ends of the cross member, respectively, and arranged to extend in a front-to-rear direction of the vehicle at outer positions in the side-to-side direction of the vehicle relative to the power storage device and the fuel tank.

According to the present invention, the power storage device and the fuel tank are disposed between the right and left side members. The power storage device and the fuel tank can therefore be protected by the right and left side members without having to provide any particular reinforcement when loads are applied sideways to the vehicle due to a vehicle crash or the like.

A vehicle according to another aspect of the present invention has an internal combustion engine and a rotating electric machine as power sources. The vehicle includes a rear seat disposed above a floor panel, a power storage device disposed in a region located below the rear seat for storing driving electric power for the rotating electric machine, a fuel tank disposed in a region located behind the power storage device and below the floor panel for holding liquid fuel to be burned in the internal combustion engine, and a suspension member disposed in a region located behind the rear seat and below the floor panel to extend in a side-to-side direction of the vehicle. The fuel tank has a recessed portion located in proximity to the suspension member so as not to interfere with the suspension member.

According to the present invention, the liquid fuel to be burned in the internal combustion engine is usually a highly volatile liquid such as gasoline or alcohol. Therefore, the fuel tank holding the liquid fuel to be burned in the internal combustion engine needs to be airtight, but may be formed in a relatively optional shape, which means that the fuel tank is less restricted in shape than the power storage device that houses therein a plurality of battery cells and the like. Accordingly, the power storage device is disposed in the region located below the rear seat where the suspension member is not disposed so that a significantly large space can be ensured. The fuel tank is disposed in the region located behind the power storage device and below the floor panel. Further, taking advantage of the characteristic of being less restricted in shape, the fuel tank has a recessed portion located in proximity to the suspension member so as not to interfere with the suspension member. This allows utilization of the vacant space located below the rear seat that is usually less likely to be used, as the space for the power storage device, and also allows the space in the neighborhood of the suspension member located below the floor panel (i.e., external to the vehicle compartment) to be effectively utilized as the space for the fuel tank which is less restricted in shape than the power storage device. Accordingly, the mounting space for the power storage device and the fuel tank can be ensured without degrading the comfort in the vehicle compartment. As a result, a vehicle having an internal combustion engine and a rotating electric machine as power sources can be provided that makes effective use of the space in the neighborhood of the rear seat to ensure the mounting space for the power storage device and the fuel tank without degrading the comfort in the vehicle compartment.

More preferably, the vehicle further includes right and left side members disposed to extend in a front-to-rear direction of the vehicle at outer positions in the side-to-side direction of the vehicle relative to the power storage device and the fuel tank, and a cross member disposed on the bottom face of the floor panel located behind the rear seat to connect the right and left side members.

According to the present invention, the power storage device and the fuel tank are disposed between the right and left side members. The power storage device and the fuel tank can therefore be protected by the right and left side members without having to provide any particular reinforcement when loads are applied sideways to the vehicle due to a vehicle crash or the like. In particular, the cross member is disposed on the bottom face of the floor panel located behind the rear seat (i.e., above the fuel tank) to improve the rigidity of the right and left side members. The fuel tank can therefore be protected appropriately without having to provide any particular reinforcement.

More preferably, in the vehicle, the floor panel has a portion behind the rear seat formed higher than a portion in front of the rear seat.

According to the present invention, the floor panel has the portion behind the rear seat formed higher than the portion in front of the rear seat such that the floor panel does not interfere with the right and left rear wheels, for example. This increases the space below the floor panel located behind the rear seat, so that a larger capacity of the fuel tank can be ensured.

More preferably, in the vehicle, the floor panel has a portion below the rear seat formed lower than the portion of the floor panel located behind the rear seat. The power storage device is disposed between the portion of the floor panel located below the rear seat and the bottom face of the rear seat. The fuel tank is disposed in a region located below the portion of the floor panel located behind the rear seat, and is substantially equal in level to the power storage device.

According to the present invention, the power storage device is disposed in the vacant space in the vehicle compartment between the bottom face of the rear seat and the floor panel that is usually less likely to be used. This not only enables mounting of the power storage device without degrading the comfort in the vehicle compartment, but also enables protection of the power storage device against dust and cold. Further, the floor panel has the portion behind the rear seat formed higher than the portion located below the rear seat, and the fuel tank is disposed in the region located below the portion of the floor panel located behind the rear seat, and is substantially equal in level to the power storage device. Disposing the fuel tank externally to the vehicle compartment ensures a larger space in the vehicle compartment. Further, the distance from the lower end of the fuel tank to the rear seat can be shorter than in the case of disposing the fuel tank at a position lower than the power storage device. Accordingly, the center of gravity of the vehicle can be lowered to achieve stable driving of the vehicle.

More preferably, the floor panel has a portion below the rear seat formed substantially flush with the portion of the floor panel located behind the rear seat. The power storage device is disposed in a region located below the portion below the rear seat. The fuel tank is disposed in a region located below the portion of the floor panel located behind the rear seat, and is substantially equal in level to the power storage device.

According to the present invention, the power storage device is disposed in the region located below the floor panel below the rear seat (i.e., external to the vehicle compartment). The power storage device can therefore be mounted without degrading the comfort in the vehicle compartment. Further, there is no need to provide the floor panel with a hole for discharging, out of the vehicle compartment, water produced within and around the power storage device or a hole through which a harness connected to the power storage device extends out of the vehicle compartment, allowing reduction in the number of processing steps of the floor panel. The floor panel has the portion behind the rear seat formed substantially flush with the portion of the floor panel located below the rear seat. The fuel tank is disposed in the region located below the portion of the floor panel located behind the rear seat, and is substantially equal in level to the power storage device. Disposing the fuel tank externally to the vehicle compartment ensures a larger space in the vehicle compartment. Further, the distance from the lower end of the fuel tank to the rear seat can be shorter than in the case of disposing the fuel tank at a position lower than the power storage device. Accordingly, the center of gravity of the vehicle can be lowered to achieve stable driving of the vehicle.

More preferably, the vehicle further includes a power storage device disposed in a region located behind the rear seat and above the floor panel as well as the power storage device disposed in the region located below the rear seat.

According to the present invention, one of the two power storage devices is disposed in the region located below the rear seat, and the other is disposed in the region located behind the rear seat and above the floor panel. This minimizes the degradation of comfort in the vehicle compartment and prevents the center of gravity of the vehicle from being displaced rearward, as compared to the case of disposing the two power storage devices in a compartment space located behind the rear seat.

BEST MODES FOR CARRYING OUT THE INVENTION

Figure 1:
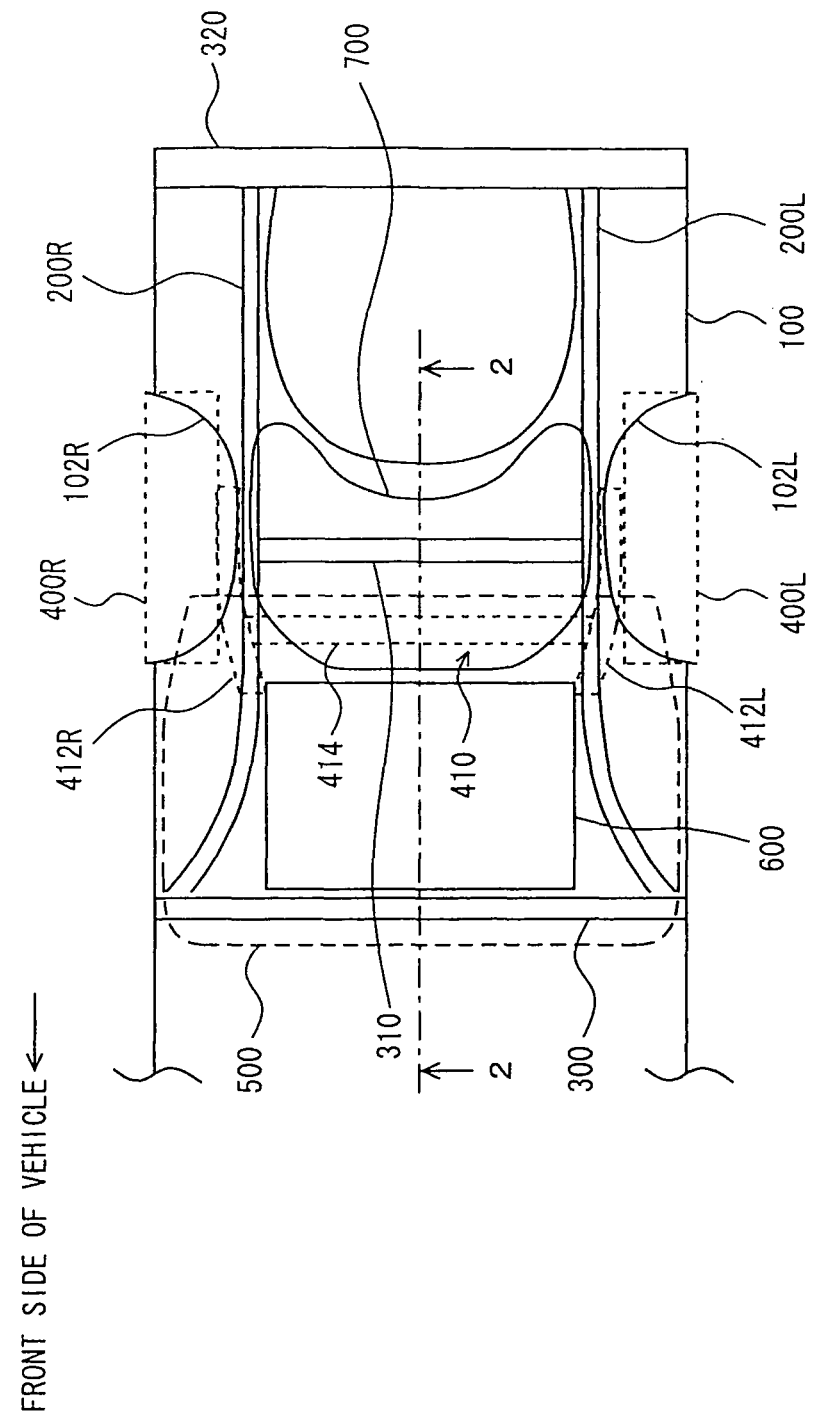
FIGS. 1 and 2 illustrate a structure in the neighborhood of a rear seat of a vehicle according to a first embodiment of the present invention.

Embodiments of the present invention will be described hereinbelow with reference to the drawings. In the following description, like parts are denoted by like reference characters, and are identical in name and function as well. Therefore, detailed description thereof will not be repeated.

First Embodiment

Figure 2:
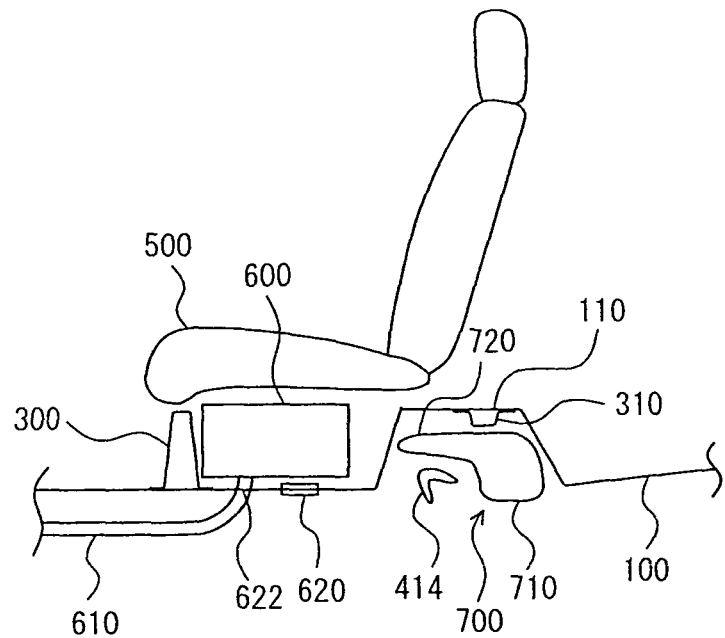

With reference to FIGS. 1 and 2, a vehicle according to an embodiment of the present invention will be described. FIG. 1 is a perspective view of a rear part of the vehicle as viewed from above. FIG. 2 is a sectional view taken along the line 2-2 of FIG. 1.

This vehicle is a hybrid vehicle having en engine and a motor generator (neither shown) as power supplies. The engine, the motor generator and an inverter (not shown) connected to the motor generator are disposed in an engine compartment at the front part of the vehicle. The vehicle includes a rear floor panel 100, right and left side members 200R and 200L, a first rear cross member 300, a second rear cross member 310, a third rear cross member 320, right and left rear wheels 400R and 400L, a suspension member 410, a rear seat 500, a battery pack 600 and a fuel tank 700.

Rear floor panel 100 constitutes the floor surface at the rear part of the vehicle compartment. Rear seat 500 is disposed above rear floor panel 100. Right and left rear wheels 400R and 400L are disposed in a region located behind rear seat 500 and below rear floor panel 100. A luggage compartment is provided in the space located behind rear seat 500 in the vehicle compartment. Rear floor panel 100 is formed with a raised portion 110 (see FIG. 2) behind rear seat 500 raised upwardly so as not to interfere with right and left wheel house portions 102R and 102L that cover rear wheels 400R and 400L, respectively. Rear floor panel 100 has portions in front of and directly below rear seat 500 disposed substantially horizontally at a position lower than raised portion 110.

Right and left side members 200R and 200L are connected to the bottom face of rear floor panel 100 and arranged to extend in the front-to-rear direction of the vehicle at outer positions in the side-to-side direction relative to battery pack 600 and fuel tank 700. Right and left side members 200R and 200L are also raised upwardly at positions corresponding to the wheel houses that cover rear wheels 400R and 400L, respectively.

To improve the rigidity of the vehicle body, first rear cross member 300, second rear cross member 310 and third rear cross member 320 are arranged to extend in the side-to-side direction of the vehicle to be connected to right and left side members 200R and 200L. First rear cross member 300 is disposed on the top face of rear floor panel 100 located below the front portion of rear seat 500. Second rear cross member 310 is disposed on the bottom face of raised portion 110 of rear floor panel 100. Third rear cross member 320 is disposed on the bottom face of the rear end of rear floor panel 100.

Suspension member 410 is a component of a suspension device of the vehicle, and includes trailing arms 412R, 412L and a cross beam 414.

Trailing arm 412R has its rear end connected to right rear wheel 400R and its front end connected rotatably to side member 200R. Trailing arm 412L has its rear end connected to left rear wheel 400L and its front end connected rotatably to side member 200L. Trailing arms 412R and 412L are provided independently from each other. A shock absorber and a coil spring (neither shown) are connected between the rear end of trailing arm 412R and side member 200R and between the rear end of trailing arm 412L and side member 200L. Heavy loads received from rear wheels 400R and 400L during vehicle driving are absorbed into the shock absorbers and the coil springs, which reduces shock during driving.

Cross beam 414 is disposed in a region located behind rear seat 500 and below rear floor panel 100 to couple trailing arms 412R and 412L to each other substantially at their central positions in the front-to-rear direction of the vehicle.

Battery pack 600 is disposed in a region enclosed by first rear cross member 300, rear seat 500 and rear floor panel 100. Battery pack 600 is formed in a rectangular parallelepiped shape, and houses therein a secondary battery with a plurality of battery modules connected in series, the battery modules each having therein a plurality of battery cells connected in series. Battery pack 600 is connected to the inverter disposed in the engine compartment with a power cable 610, for supplying electric power to the motor generator via the inverter and storing electric power generated by the motor generator. Rear floor panel 100, below battery pack 600, is provided with a drain hole 620 for discharging, out of the vehicle, water produced within and around battery pack 600 and a through hole 622 for power cable 610.

Fuel tank 700 is substantially equal in level to battery pack 600 in a region located behind battery pack 600 enclosed by the bottom face of raised portion 110 and right and left rear wheels 400R and 400L to be fixed to right and left side members 200R and 200L. Fuel tank 700 holds liquid fuel such as gasoline or alcohol to be supplied to the engine. Fuel tank 700 is disposed between right and left trailing arms 412R and 412L so as not to interfere with right and left trailing arms 412R, 412L, the shock absorbers and the coil springs.

Further, fuel tank 700 is shaped so as not to interfere with cross beam 414. More specifically, fuel tank 700 is composed of a body 710 located behind cross beam 414 and a projecting portion 720 formed integrally with body 710 and projecting forward from upper side surfaces of body 710 so as to extend into the space located between second rear cross member 310 and cross beam 414. That is, fuel tank 700 has a recessed portion at the lower front side close to cross beam 414 so as not to interfere with cross beam 414. A filler tube (not shown) extending rearward and upward is provided at the left end of fuel tank 700, and a fuel supply port (not shown) is provided at the upper end of the filler tube.

The effect of the vehicle according to the present embodiment based on the above-described structure will now be described. As described above, rear floor panel 100 is formed with raised portion 110 raised upwardly so as not to interfere with right and left wheel house portions 102R and 102L. This creates a larger space below raised portion 110 than the space located below rear floor panel 100 except below raised portion 110. However, cross beam 414 is disposed in the region located below raised portion 110 to extend in the side-to-side direction of the vehicle. Therefore, to mount components in the space located below raised portion 110, the components need to be shaped such that they do not interfere with cross beam 414.

Herein, the liquid fuel such as gasoline or alcohol to be supplied to the engine is a highly volatile liquid. Therefore, fuel tank 700 needs to be airtight, but may be formed in a relatively optional shape. In contrast, battery pack 600 is restricted in shape, for example, in the shape of a plurality of battery cells and battery modules housed therein and the position at which they are connected. In other words, fuel tank 700 is less restricted in shape than battery pack 600.

Battery pack 600 is thus disposed in the space between rear seat 500 and rear floor panel 100. This allows the space located below rear seat 500 where a significantly large space can be ensured without being limited by cross beam 414 to be utilized as the mounting space for battery pack 600. Further, disposing battery pack 600 in the space located below rear seat 500 in the vehicle compartment that is usually less likely to be used enables protection of battery pack 600 against dust and cold without degrading the comfort in the vehicle compartment.

Fuel tank 700 is disposed in the region located below raised portion 110 where cross beam 414 is disposed. Taking advantage of the characteristic of being less restricted in shape, fuel tank 700 is composed of body 710 located behind cross beam 414 and projecting portion 720 projecting between second rear cross member 310 and cross beam 414. This ensures a sufficient height of body 710 without being limited by cross beam 414, and also allows projecting portion 720 holding fuel to be disposed even in the narrow space located between second rear cross member 310 and cross beam 414. A large capacity of fuel tank 700 can therefore be ensured even when fuel tank 700 is mounted in the region located below raised portion 110. Accordingly, the space located below raised portion 110 external to the vehicle compartment can be utilized effectively as the mounting space for fuel tank 700.

Further, fuel tank 700 is substantially equal in level to battery pack 600, so that the distance from the lower end of fuel tank 700 to rear seat 500 can be shorter than in the case of disposing fuel tank 700 below rear floor panel 100 except below raised portion 110 (i.e., disposing fuel tank 700 at a position lower than battery pack 600). Accordingly, the center of gravity of the vehicle can be lowered to achieve stable driving of the vehicle.

Right and left side members 200R and 200L are arranged to extend in the front-to-rear direction of the vehicle at outer positions in the side-to-side direction of the vehicle relative to battery pack 600 and fuel tank 700. Right and left side members 200R and 200L are connected by first rear cross member 300, second rear cross member 310 and third rear cross member 320 to improve the rigidity. Battery pack 600 and fuel tank 700 can therefore be protected by right and left side members 200R and 200L against loads that may be applied sideways to the vehicle due to a vehicle crash or the like. In particular, the provision of second rear cross member 310 on the bottom face of raised portion 110 below which fuel tank 700 is disposed enables protection of fuel tank 700 without having to provide any particular reinforcement, even when heavy loads are applied sideways.

As described above, with the vehicle according to the present embodiment, the battery pack is disposed in the region located below the rear seat not limited by the cross beam. The fuel tank less restricted in shape than the battery pack is disposed in the region located below the raised portion of the rear floor panel where the cross beam is disposed. The fuel tank is arranged so as to ensure a large tank capacity without interfering with the cross beam. Accordingly, in the vehicle having the engine and the motor generator as power supplies, the mounting space for the battery pack and the fuel tank can be ensured without degrading the comfort in the vehicle compartment.

While fuel tank 700 is composed of body 710 and projecting portion 720 in the present embodiment, it is not always necessary to provide projecting portion 720, provided that body 710 alone can ensure a sufficient capacity of the fuel tank.

Modification of First Embodiment

The structure of the vehicle according to the above-described first embodiment may be modified as described hereinbelow according to the present modification.

Figure 3:
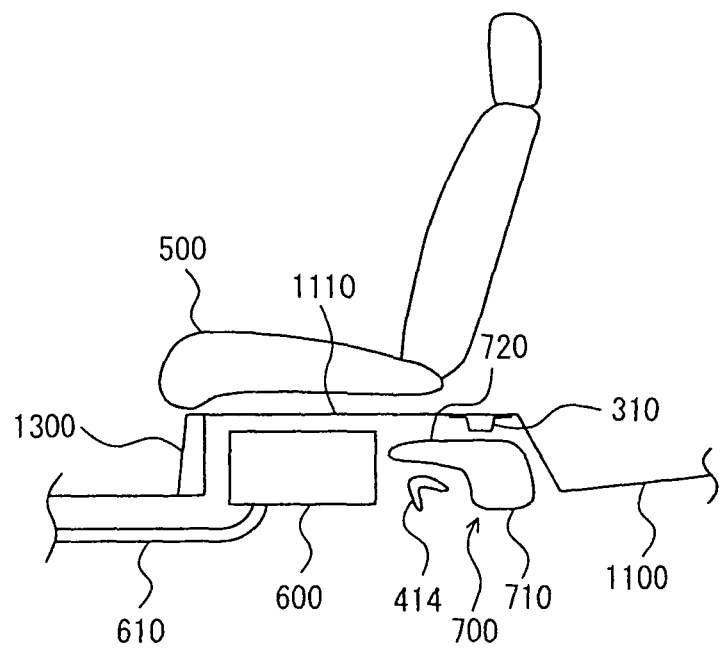
FIG. 3 illustrates a structure in the neighborhood of a rear seat of a vehicle according to a modification of the first embodiment of the present invention.

More specifically, rear floor panel 100 and first rear cross member 300 according to the above-described first embodiment are replaced with a rear floor panel 1100 and a first rear cross member 1300, as shown in FIG. 3.

Rear floor panel 1100 is formed with a raised portion 1110 raised upwardly from below rear seat 500 to the rear side. First rear cross member 1300 is connected to the front end face of raised portion 1110 disposed substantially vertically.

In the region located below raised portion 1110, battery pack 600 is disposed at the front side (i.e., below rear seat 500), while cross beam 414 and fuel tank 700 are disposed at the rear side.

As described above, in the region located below raised portion 1110, battery pack 600 is disposed at the front side where cross beam 414 is not disposed, while fuel tank 700 is disposed at the rear side where cross beam 414 is disposed. Accordingly, similarly to the first embodiment, the mounting space for battery pack 600 and fuel tank 700 can be ensured without degrading the comfort in the vehicle compartment.

Further, different from the above-described first embodiment, battery pack 600 is disposed externally to the vehicle compartment. This eliminates the need to provide rear floor panel 1100 with a drain hole or a through hole for a power cable, allowing reduction in the number of processing steps of the rear floor panel.

Second Embodiment

Figure 4:
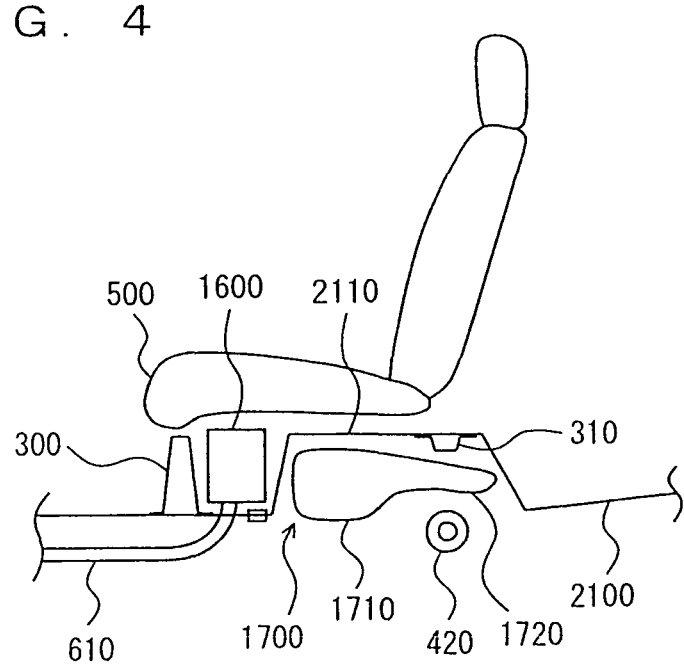
FIG. 4 illustrates a structure in the neighborhood of a rear seat of a vehicle according to a second embodiment of the present invention.

With reference to FIG. 4, a vehicle according to the present embodiment will now be described. The vehicle according to the present embodiment is different from that of the above-described first embodiment in that rear floor panel 100, fuel tank 700, battery pack 600 and suspension member 410 are replaced with a rear floor panel 2100, a fuel tank 1700, a battery pack 1600 and a stabilizer 420. The remaining structure is identical to that of the vehicle according to the above-described first embodiment. Like components are denoted by like reference characters, and function identically. Therefore, detailed description thereof will not be repeated here.

Rear floor panel 2100 is formed with a raised portion 2110 raised upwardly from the central position below rear seat 500 in the front-to-rear direction of the vehicle to the rear side.

Battery pack 1600 is disposed between rear floor panel 2100 and the bottom face of rear seat 500 in front of raised portion 2110. Stabilizer 420 and fuel tank 1700 are disposed in a region located below raised portion 2110.

Stabilizer 420 is a component of a suspension device of the vehicle. Stabilizer 420 extends in the side-to-side direction of the vehicle at the rear side in the region located below raised portion 2110 to couple right and left suspension arms (not shown) provided for right and left rear wheels 400R and 400L, respectively.

Fuel tank 1700 is substantially equal in level to battery pack 1600 in the region located below raised portion 2110. Fuel tank 1700 is composed of a body 1710 located in front of stabilizer 420 and a projecting portion 1720 formed integrally with body 1710 and projecting between the bottom face of raised portion 2110 and stabilizer 420.

As described above, with the vehicle according to the present embodiment, battery pack 1600 is disposed between rear floor panel 2100 and the bottom face of rear seat 500 in front of raised portion 2110. Fuel tank 1700 is disposed in the region located below raised portion 2110, and is composed of body 1710 located in front of stabilizer 420 and projecting portion 1720 projecting between the bottom face of raised portion 2110 and stabilizer 420. This ensures a large capacity of fuel tank 1700. Accordingly, similarly to the first embodiment, the mounting space for battery pack 1600 and fuel tank 1700 can be ensured without degrading the comfort in the vehicle compartment.

Modification of Second Embodiment

The structure of the vehicle according to the above-described second embodiment may be modified as described hereinbelow according to the present modification.

Figure 5:
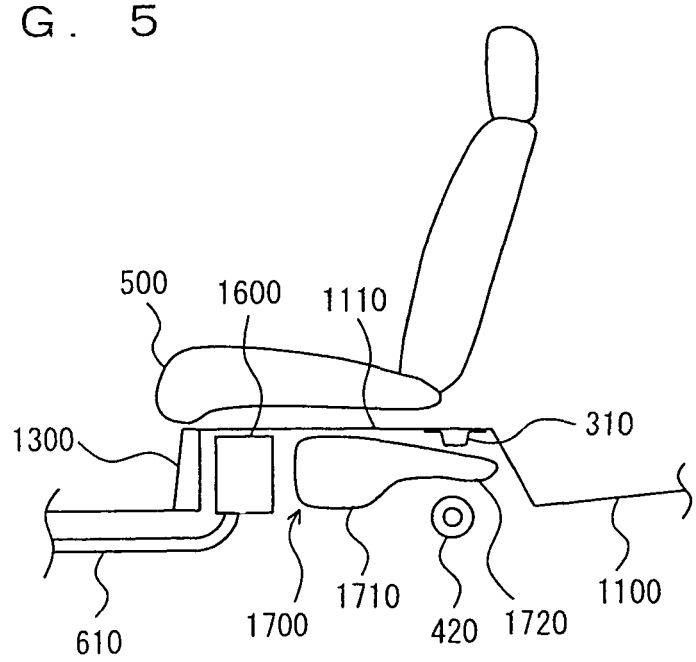
FIG. 5 illustrates a structure in the neighborhood of a rear seat of a vehicle according to a modification of the second embodiment of the present invention.

More specifically, rear floor panel 2100 and first rear cross member 300 according to the above-described second embodiment are replaced with rear floor panel 1100 and first rear cross member 1300 described in the modification of the first embodiment as shown in FIG. 5.

In the region located below raised portion 1110, battery pack 1600 is disposed at the front side, while fuel tank 1700 is disposed at the rear side.

As described above, in the region located below raised portion 1110, battery pack 1600 is disposed at the front side where stabilizer 420 is not disposed, while fuel tank 700 is disposed at the rear side where stabilizer 420 is disposed.

Accordingly, similarly to the second embodiment, the mounting space for battery pack 1600 and fuel tank 1700 can be ensured without degrading the comfort in the vehicle compartment. Further, similarly to the modification of the above-described first embodiment, disposing battery pack 1600 externally to the vehicle compartment eliminates the need to provide rear floor panel 1100 with a drain hole or a through hole for a power cable, allowing reduction in the number of processing steps of the rear floor panel.

Third Embodiment

Figure 6:
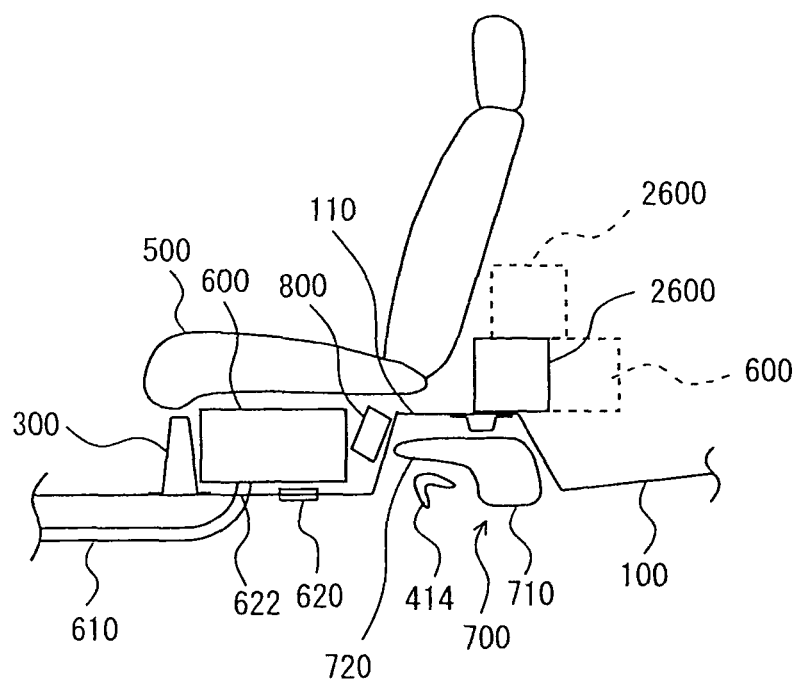
FIG. 6 illustrates a structure in the neighborhood of a rear seat of a vehicle according to a third embodiment of the present invention.

With reference to FIG. 6, a vehicle according to the present embodiment will now be described. The vehicle according to the present embodiment is different from that of the above-described first embodiment in that a battery pack 2600 and a junction box 800 are included additionally. The remaining structure is identical to that of the vehicle according to the above-described first embodiment. Like components are denoted by like reference characters, and function identically. Therefore, detailed description thereof will not be repeated here.

Battery pack 2600 is connected to the inverter mounted in the engine compartment in parallel with battery pack 600. Battery pack 2600 may alternatively be connected in series to battery pack 600. Battery pack 2600 may be a large-capacitance capacitor. Battery pack 2600 is disposed on the top face of raised portion 110.

Junction box 800 is disposed between the rear end of battery pack 600 and the front inclined surface of raised portion 110. Junction box 800 is electrically connected between battery packs 600, 2600 and the inverter. Junction box 800 houses therein a system main relay that establishes connection and interruption between battery packs 600, 2600 and the inverter.

As described above, with the vehicle according to the present embodiment, battery pack 600 is disposed in the region located below rear seat 500, while fuel tank 700 is disposed in the region located below raised portion 110. Accordingly, similarly to the above-described first embodiment, the mounting space for battery pack 600 and fuel tank 700 can be ensured without sacrificing the compartment space.

Further, the vehicle according to the present embodiment is provided with battery pack 2600 in addition to battery pack 600. Battery pack 2600 is disposed on the top face of raised portion 110. This reduces the space in the compartment located behind rear seat 500. However, this minimizes the degradation of comfort in the vehicle compartment and prevents the center of gravity of the vehicle from being displaced upward or rearward, as compared to the case of, for example, disposing battery pack 600 on the top face of raised portion 110 and disposing battery pack 2600 on the top face of battery pack 600 (see dotted lines in FIG. 6).

Fourth Embodiment

Figure 7:
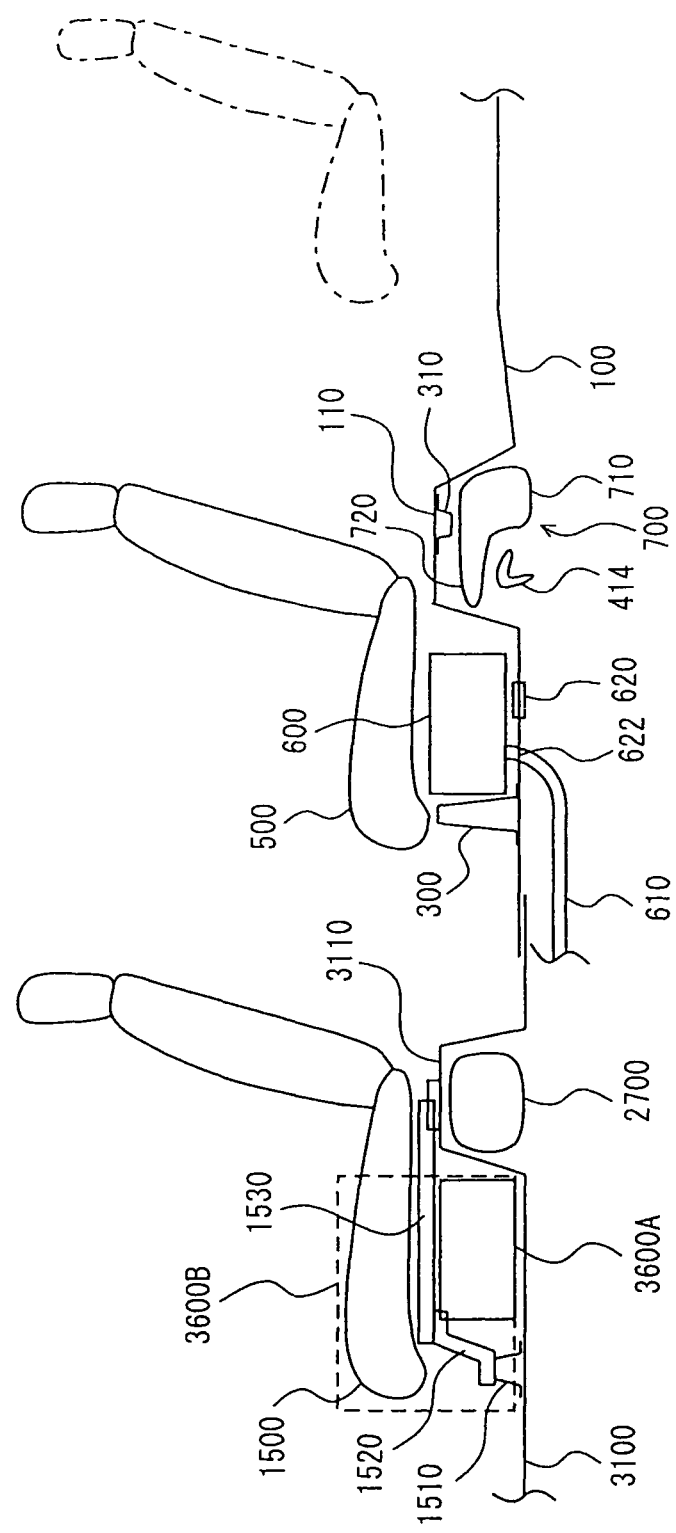
FIGS. 7 and 8 illustrate a structure in the neighborhood of a front seat and in the neighborhood of a rear seat of a vehicle according to a fourth embodiment of the present invention.

With reference to FIG. 7, a vehicle according to the present embodiment of the present invention will now be described. The vehicle according to the present embodiment is different from that of the above-described first embodiment in that the structure in the neighborhood of a front seat is shown. The remaining structure is identical to that of the vehicle according to the above-described first embodiment. Like components are denoted by like reference characters, and function identically. Therefore, detailed description thereof will not be repeated here.

The vehicle includes a front floor panel 3100, a front seat 1500, a cross member 1510, a seat bracket 1520, a seat rail 1530, battery packs 3600A, 3600B and a fuel tank 2700.

Front floor panel 3100 is connected to the front end of rear floor panel 100 to form the floor surface of a front part of the vehicle compartment. Front seat 1500 is disposed above front floor panel 3100. Front floor panel 3100, behind front seat 1500, is formed with a raised portion 3110 raised upwardly.

Cross member 1510 is disposed on the top face of front floor panel 3100 below the front portion of front seat 1500. Seat bracket 1520 is fixed on top of cross member 1510.

Seat rail 1530 is arranged to extend substantially horizontally in the front-to-rear direction of the vehicle, and is provided one each at the right and left sides on the bottom face of front seat 1500. Seat rail 1530 has its front end fixed to cross member 1510 with seat bracket 1520 interposed therebetween. Seat rail 1530 has its rear end fixed to the top face of raised portion 3110.

Front seat 1500 is provided one each at the right and left sides of the vehicle, and is connected onto seat rail 1530 to be slidable in the front-to-rear direction.

Battery packs 3600A and 3600B are formed in a rectangular parallelepiped shape, and are connected to the inverter in parallel with battery pack 600. Battery packs 3600A and 3600B may alternatively be connected in series with battery pack 600.

Battery pack 3600A is disposed on the top face of front floor panel 3100 below front seat 1500. Battery pack 3600B is disposed on the top face of front floor panel 3100 between right and left front seats 1500.

Fuel tank 2700 is substantially equal in level to battery pack 3600A in the region located below raised portion 3110.

As described above, the vehicle according to the present embodiment is provided with battery packs 3600A and 3600B in addition to battery pack 600, and fuel tank 2700 in addition to fuel tank 700.

Battery pack 3600A is disposed in the region located below front seat 1500. Battery pack 3600B is disposed in the space between right and left front seats 1500. Fuel tank 2700 is disposed substantially in parallel to fuel tank 2700 in the region located below raised portion 3110 of front floor panel 3100.

Accordingly, the center of gravity of the vehicle can be prevented from being displaced rearward, and reduction of the luggage compartment in space can be avoided, as compared to the case of, for example, disposing battery packs 3600A, 3600B and fuel tank 2700 in the luggage compartment located behind rear seat 500. In addition, a third seat (see dash-dot lines in FIG. 7) can further be provided behind rear seat 500.

Figure 8:
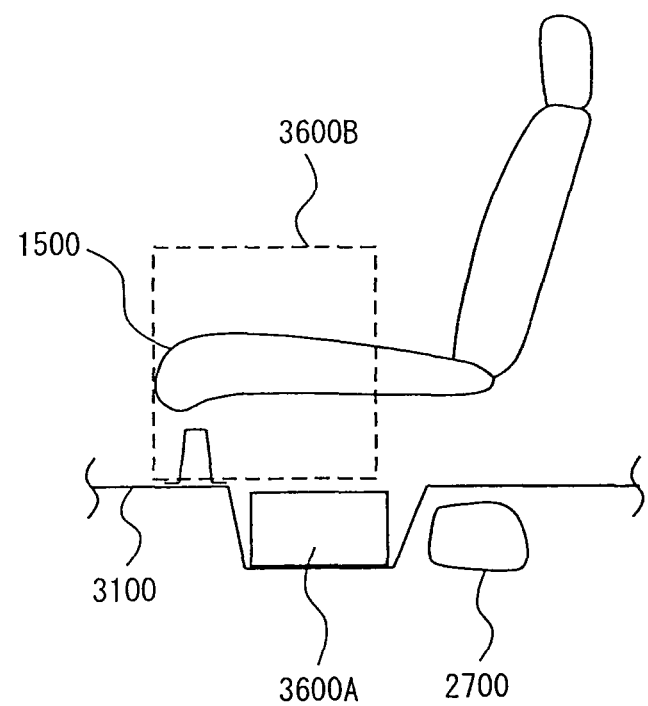

In the present embodiment, fuel tank 2700 is disposed in the region located below raised portion 3110 of front floor panel 3100, and battery pack 3600A is substantially equal in level to fuel tank 2700. However, the mounting positions of battery pack 3600A and fuel tank 2700 are not limited as such. For example, as shown in FIG. 8, front floor panel 3100 may be formed with a depression located below front seat 1500. Battery pack 3600A may be disposed in the depression, and fuel tank 2700 may be substantially equal in level to battery pack 3600A in the region located below front floor panel 3100 located behind the depression.

It should be understood that the embodiments disclosed herein are illustrative and non-restrictive in every respect. The scope of the present invention is defined by the claims, not by the description above, and is intended to include any modification within the meaning and scope equivalent to the terms of the claims.

The invention claimed is:

1. A vehicle having an internal combustion engine and a rotating electric machine as power sources, comprising:
   a rear seat disposed above a floor panel;
   a power storage device disposed in a region located below said rear seat for storing driving electric power of said rotating electric machine;
   a fuel tank disposed in a region located behind said power storage device below said floor panel for holding liquid fuel to be burned in said internal combustion engine; and
   a suspension member and a vehicle structural member disposed in a region located behind said rear seat and below said floor panel,
   wherein said suspension member and said vehicle structural member extend in a side-to-side direction of said vehicle, and
   wherein said fuel tank includes a portion that extends into a space located between said suspension member and said vehicle structural member.

2. The vehicle according to claim 1, wherein said vehicle structural member is a cross member arranged on a bottom face of said floor panel located behind said rear seat to extend in the side-to-side direction of said vehicle.

3. The vehicle according to claim 2, further comprising right and left side members connected to opposite ends of said cross member, respectively, and arranged to extend in a front-to-rear direction of said vehicle at outer positions in the side-to-side direction of said vehicle relative to said power storage device and said fuel tank.

4. The vehicle according to claim 1, wherein
   said floor panel has a portion located behind said rear seat formed higher than a portion in front of said rear seat.

5. The vehicle according to claim 4, wherein
   said floor panel has a portion located below said rear seat formed lower than said portion of said floor panel located behind said rear seat,
   said power storage device is disposed between said portion of said floor panel located below said rear seat and a bottom face of said rear seat, and
   said fuel tank is disposed in a region located below said portion of said floor panel located behind said rear seat, and is substantially equal in level to said power storage device.

6. The vehicle according to claim 4, wherein
   said floor panel has a portion below said rear seat formed substantially flush with said portion of said floor panel located behind said rear seat,
   said power storage device is disposed in a region located below said portion of said floor panel located below said rear seat, and
   said fuel tank is disposed in a region located below said portion of said floor panel located behind said rear seat, and is substantially equal in level to said power storage device.

7. The vehicle according to claim 1, further comprising a power storage device disposed in a region located behind said rear seat and above said floor panel as well as the power storage device disposed in the region located below said rear seat.

8. The vehicle according to claim 1, wherein said space is a space in a height direction of said vehicle.

9. The vehicle according to claim 1, wherein said portion extends in a forward direction or in a rearward direction of said vehicle.

10. The vehicle according to claim 1, wherein the suspension member is a component of a suspension device of the vehicle.

11. A vehicle having an internal combustion engine and a rotating electric machine as power sources, comprising:

a rear seat disposed above a floor panel;

a power storage device disposed in a region located below said rear seat for storing driving electric power for said rotating electric machine;

a fuel tank disposed in a region located behind said power storage device and below said floor panel for holding liquid fuel to be burned in said internal combustion engine; and a suspension member disposed in a region located behind said rear seat and below said floor panel to extend in a side-to-side direction of said vehicle, said fuel tank having a recessed portion located in proximity to said suspension member so as not to interfere with said suspension member, wherein said fuel tank and said suspension member at least partially overlap each other when viewed in a height direction of said vehicle and when viewed in a forward or rearward direction of said vehicle.

12. The vehicle according to claim 11, further comprising:

right and left side members disposed to extend in a front-to-rear direction of said vehicle at outer positions in the side-to-side direction of said vehicle relative to said power storage device and said fuel tank; and a cross member disposed on a bottom face of said floor panel located behind said rear seat to connect said right and left side members.

13. The vehicle according to claim 11, wherein said floor panel has a portion located behind said rear seat formed higher than a portion in front of said rear seat.

14. The vehicle according to claim 13, wherein said floor panel has a portion located below said rear seat formed lower than said portion of said floor panel located behind said rear seat, said power storage device is disposed between said portion of said floor panel located below said rear seat and a bottom face of said rear seat, and said fuel tank is disposed in a region located below said portion of said floor panel located behind said rear seat, and is substantially equal in level to said power storage device.

15. The vehicle according to claim 13, wherein said floor panel has a portion below said rear seat formed substantially flush with said portion of said floor panel located behind said rear seat, said power storage device is disposed in a region located below said portion of said floor panel located below said rear seat, and said fuel tank is disposed in a region located below said portion of said floor panel located behind said rear seat, and is substantially equal in level to said power storage device.

16. The vehicle according to claim 11, further comprising a power storage device disposed in a region located behind said rear seat and above said floor panel as well as the power storage device disposed in the region located below said rear seat.

* * * * *